United States Patent
Wallace et al.

(10) Patent No.: US 8,616,342 B2
(45) Date of Patent: Dec. 31, 2013

(54) ELECTRONIC STROKE SENSOR FOR AIR DISC BRAKE

(75) Inventors: Thomas Edward Wallace, Charlotte, NC (US); Richard J Rink, Charlotte, NC (US); Mark David Chandler, Bloomfield, NY (US); Glenn Singletary, Concord, NC (US); Wayne Oster, Redwood Valley, CA (US); Steve Lepard, Concord, NC (US); Christopher Prager, Concord, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 96 days.

(21) Appl. No.: 13/162,691

(22) Filed: Jun. 17, 2011

(65) Prior Publication Data

US 2011/0308897 A1 Dec. 22, 2011

Related U.S. Application Data

(60) Provisional application No. 61/356,325, filed on Jun. 18, 2010.

(51) Int. Cl.
*F16D 66/00* (2006.01)
(52) U.S. Cl.
USPC ............ 188/1.11 R; 188/1.11 W; 188/1.11 E; 188/196 R; 188/71.7
(58) Field of Classification Search
USPC ....... 188/1.11 R, 1.11 W, 1.11 E, 71.7, 196 R
See application file for complete search history.

(56) References Cited

U.S. PATENT DOCUMENTS

| | | | |
|---|---|---|---|
| 4,172,364 A * | 10/1979 | Young | 60/550 |
| 4,596,319 A * | 6/1986 | Cumming | 188/79.55 |
| 4,995,480 A | 2/1991 | Hazelden et al. | |
| 5,433,296 A | 7/1995 | Webberley | |
| 5,450,930 A * | 9/1995 | Martens et al. | 188/1.11 L |
| 5,791,441 A * | 8/1998 | Matos et al. | 188/1.11 L |
| 5,825,287 A * | 10/1998 | Zarybnicky et al. | 340/453 |
| 6,105,730 A | 8/2000 | Ekeroth | |
| 6,276,494 B1 | 8/2001 | Ward et al. | |
| 6,311,804 B1 | 11/2001 | Baalmann et al. | |
| 6,341,670 B1 | 1/2002 | Leblanc et al. | |
| 6,411,203 B1 | 6/2002 | Lesesky et al. | |
| 6,411,206 B1 * | 6/2002 | Weant et al. | 340/479 |

(Continued)

OTHER PUBLICATIONS

PCT/US2011/040895 International Search Report dated Oct. 25, 2011, 2 pages.

*Primary Examiner* — Robert A Siconolfi
*Assistant Examiner* — Mahbubur Rashid
(74) *Attorney, Agent, or Firm* — Warner Norcross & Judd LLP

(57) ABSTRACT

A vehicle brake monitor assembly for an air disk brake includes a brake actuator having a pushrod projecting from inside a chamber of said brake actuator. The pushrod releasably actuates a lever arm of a caliper thereby moving the disk brake into a braking position when the pushrod is in an extended position and releasing the disk brake from the braking position when the pushrod is in a retracted position. The pushrod includes a pushrod shaft and a contact member biased in a telescoping relationship relative to the pushrod shaft and the lever arm of the caliper abuts the contact member counteracting the bias of the contact member. A sensor is integrated with the assembly proximate the contact member and detects movement of the pushrod relative to the lever arm and to the pushrod shaft.

28 Claims, 7 Drawing Sheets

Fig-2

(56) References Cited

U.S. PATENT DOCUMENTS

| | | |
|---|---|---|
| 6,481,542 B2 | 11/2002 | Giering et al. |
| 6,608,554 B2 | 8/2003 | Weant et al. |
| 6,744,352 B2 | 6/2004 | Lesesky et al. |
| 6,755,233 B2 | 6/2004 | Fisher |
| 6,891,468 B2 | 5/2005 | Koenigsberg et al. |
| 7,014,016 B2 | 3/2006 | Morris et al. |
| 7,015,800 B2 | 3/2006 | Lesesky et al. |
| 7,175,006 B2 | 2/2007 | Plantan et al. |
| 7,373,224 B2 * | 5/2008 | Goetz et al. ............. 701/32.6 |
| 7,449,993 B2 | 11/2008 | Lesesky et al. |
| 7,555,375 B2 | 6/2009 | Pettersson et al. |
| 7,624,849 B2 | 12/2009 | Goncalves et al. |
| 8,319,623 B2 | 11/2012 | Wallace et al. |
| 2007/0256901 A1 | 11/2007 | Niehorster et al. |

\* cited by examiner

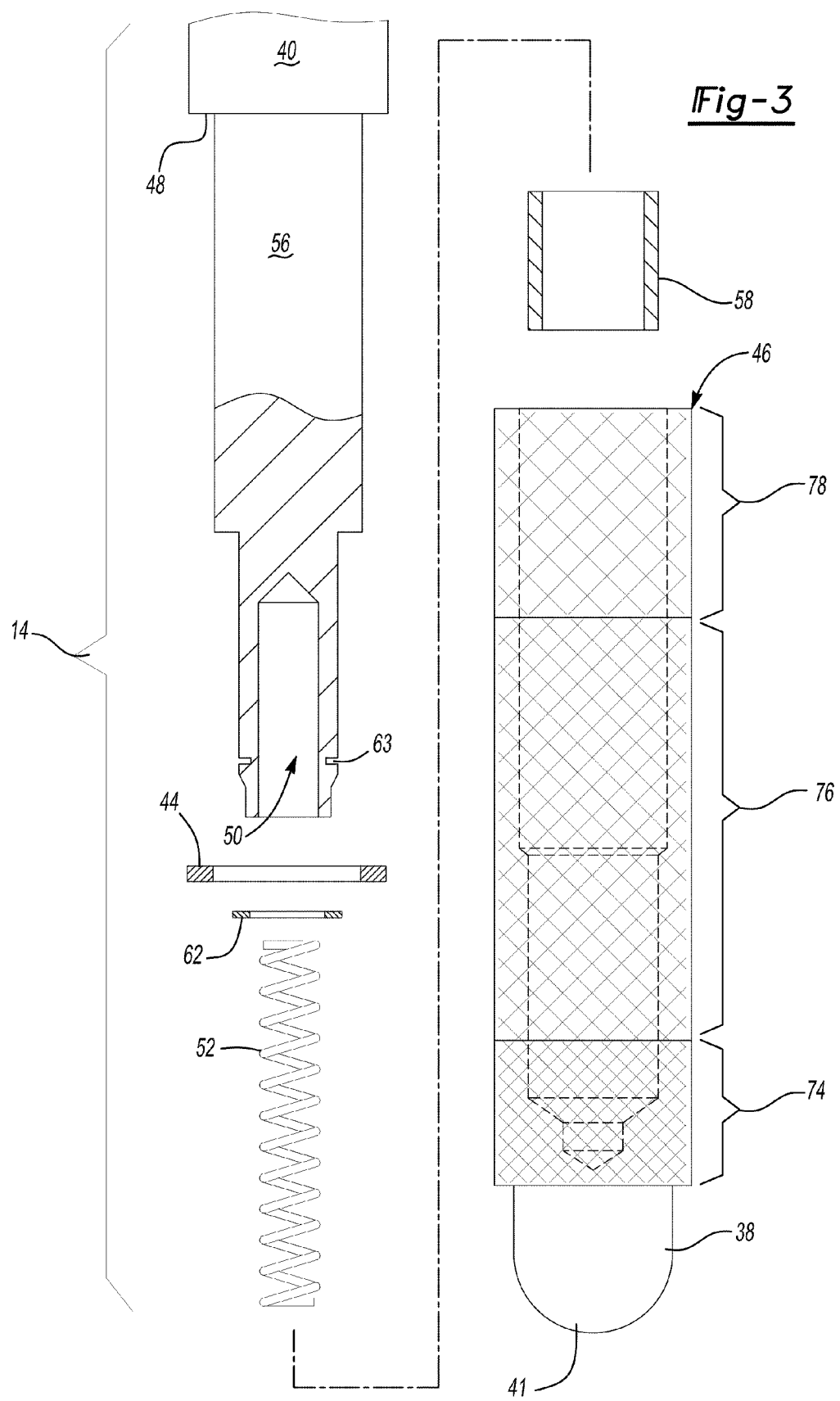

ELECTRONIC STROKE SENSOR FOR AIR DISC BRAKE

This application claims priority to U.S. Provisional Patent Application No. 61/356,325 file on Jun. 18, 2010.

BACKGROUND OF THE INVENTION

The present invention is related to an electronic stroke monitor for a vehicle brake. More specifically, the present invention is related to an electronic stroke monitor of an air disc brake for use on a heavy duty truck.

The number of miles traveled by heavy-duty trucks and passenger busses increases significantly every year. Because the size of passenger cars being driven has become smaller due to the increased price of gasoline, it has become increasingly necessary to ensure the proper performance of brake actuators and brake systems of these heavy-duty vehicles to provide the truck operator every opportunity to avoid a loss of control. Therefore, various systems have been developed to monitor the stroke of a brake actuator for use on drum brakes widely used in industrial trucking.

However, on heavy-duty passenger vehicles, such as, for example, busses, the use of air disc brakes is becoming more popular. To date, a viable brake monitoring system for use on an air disk brake has not been developed.

Brake monitoring systems used on air drum brakes are directed toward monitoring the length of stroke of a pushrod projecting from inside a chamber of the brake actuator. The monitoring enables the user to determine if the brake actuator is functioning properly, is subject to an over-stroke condition, or is subject to a hanging or dragging brake condition. Monitoring these conditions by monitoring the stroke of the pushrod is possible because the pushrod of the brake actuator is fixedly attached to the actuation device of the drum brake. In the case of a hanging or dragging brake, the actuation device of the drum brake is immobilized in an actuated position preventing the pushrod from returning to an un-actuated position when the brake pedal is released by the vehicle operator.

However, the pushrod of an air disk brake actuator is not fixedly attached to the lever arm of a caliper that actuates the disk brake. Therefore, should a hanging or dragging brake condition occur, the lever arm becomes separated from the pushrod rendering the type of monitoring system used on a drum brake non-functional for a disk brake. An electronic sensor that monitors the stroke of the pushrod senses that the pushrod has returned to its un-actuated position and incorrectly senses that the brake is operating normally. Therefore, it has become necessary to develop a vehicle brake monitoring assembly that is capable of identifying and distinguishing between an over-stroke condition and a hanging brake condition of an air disk brake.

SUMMARY OF THE INVENTION

A vehicle brake monitor assembly for an air disk brake includes a brake actuator having a pushrod projecting from inside a chamber of the brake actuator. The pushrod releasably actuates a lever arm of the caliper moving the disk brake into braking position when the pushrod is disposed in an extended position and releases the disk brake from the braking position when the pushrod is disposed in a retracted position. The pushrod includes a pushrod shaft and a contact member biased in a telescoping relationship relative to the pushrod shaft. The lever arm of the caliper abuts the contact member and counteracts the bias of the contact member preventing the contact member from telescoping from the pushrod shaft. A sensor is integrated with the assembly proximate the contact member. The sensor detects movement of the pushrod relative to the lever arm and the pushrod shaft.

The sensor that is positioned proximate the contact member detects differences in transmission along a length of the contact member that enables the determination of the condition of the brake actuator. For example, the sensor detects when the brake is operating in a normal condition, is subject to a dragging brake condition, is subject to an over stroke condition, or subject to an out of adjustment condition. As set forth above, prior attempts to monitor all these conditions on an air disk brake have proven futile. In particular, prior monitoring devices have been unable to identify a hanging brake condition due to separation between the pushrod and a lever arm of the air disk brake. This separation results when the lever arm is immobilized in an actuated position and a vehicle operator releases a brake pedal causing the pushrod to retract into the brake actuator. The telescoping design of the present invention allows the sensor to detect when the lever arm is immobilized in an actuated position.

A further benefit of the present inventive assembly is its use with a conventional brake caliper without modification to the caliper. Prior attempts to monitor air disk brake systems require modifying the brake caliper in an attempt to determine if the lever arm is immobilized in an actuated position. By providing a sensor pack proximate the pushrod of the actuator, the inventive assembly has eliminated the need to modify the caliper of an air disk brake system, to detect a dragging brake condition.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 shows an expanded view of the pushrod of the present invention;

DETAILED DESCRIPTION OF THE INVENTION

Figure 1:
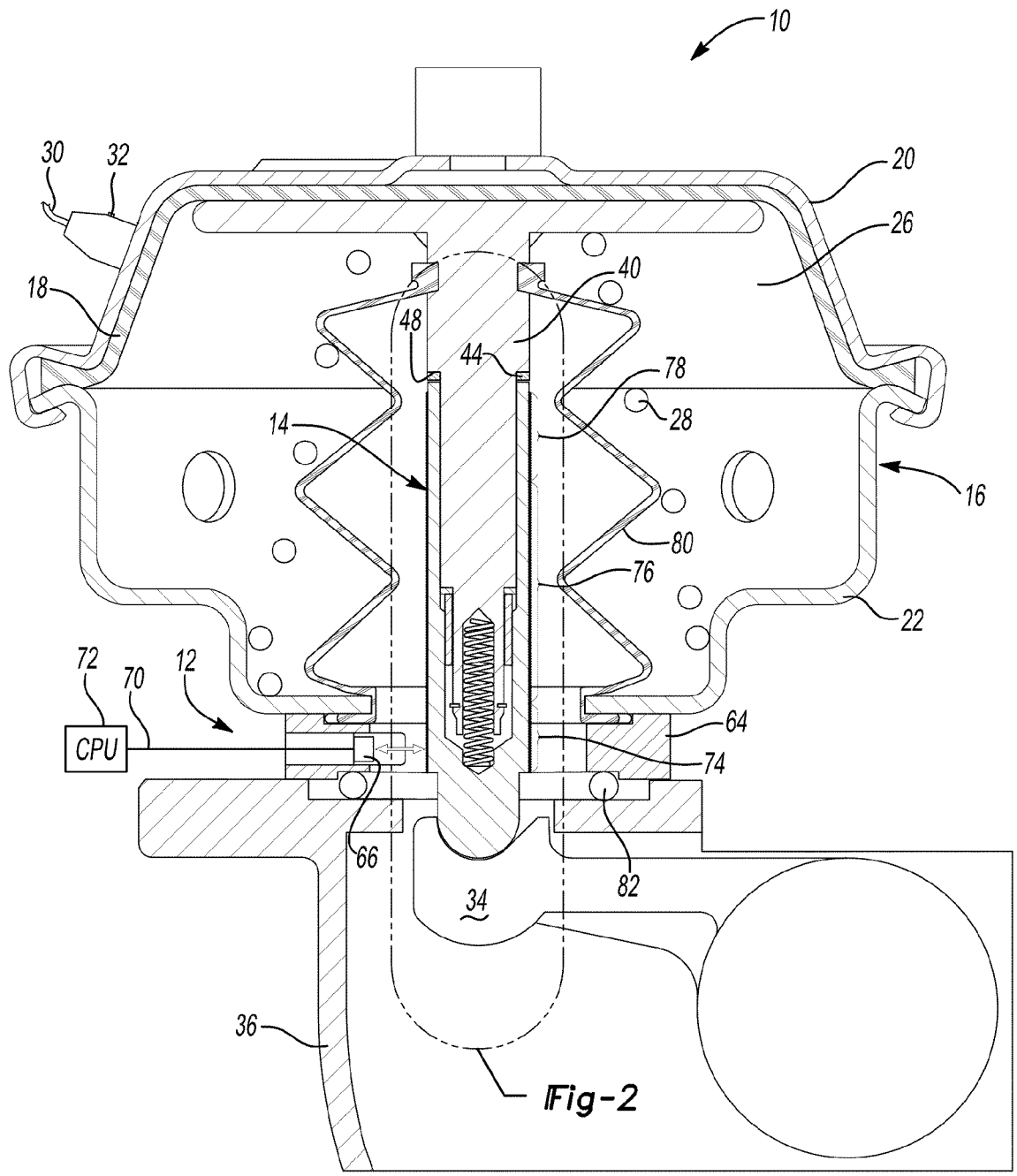
FIG. 1 shows a side sectional view of the brake monitoring assembly of the present invention.

A brake actuator is shown generally at 10 in FIG. 1. The brake actuator 10 includes a brake monitor assembly 12 for determining if the brake actuator is functioning in a normal condition or a fault condition as will be explained further hereinbelow. The brake actuator 10 includes a pushrod 14 disposed inside a service chamber 16. It should be understood by those skilled in the art that the service chamber 16 can also be used in cooperation with a secondary chamber or power spring chamber (not shown), and various other brake activator configurations, as might be necessary for a given vehicle braking system.

The service chamber 16 includes a diaphragm 18 that is secured between an upper housing member 20 and a lower housing member 22. Therefore, the service chamber 16 is separated by the diaphragm 18 into a pressure side 24 (best seen in FIG. 4) and a return side 26 which houses a return spring 28. Pressurized air enters the pressure side 24 of the service chamber 16 through air pressure port 30, the pressure of which is monitored by pressure sensor 32. Although the pressure sensor 32 is shown proximate the service chamber 16, it is contemplated by the inventors that the pressure sensor 32 is located at the treadle valve (brake pedal) of the vehicle. It should be understood to those of ordinary skill in the art that each embodiment also includes a separate pressure sensor (not shown) located at the brake pedal to identify pressure being applied by the vehicle operator to the brake pedal. When the operator actuates the brake pedal, pressurized air passes through the air pressure port 30 forcing the diaphragm 18 against the pushrod 14 causing the pushrod 14 to extend outwardly from the service chamber 16 in a known manner.

When the vehicle operator depresses the brake pedal, as set forth above, air pressure enters the pressure side 24 of the service chamber 16 through the air pressure port 30 forcing the pushrod 14 outwardly from the service chamber. A lever arm 34 disposed inside a caliper 36 is pivoted by the pushrod 14, when extending outwardly, causing the brakes (not shown) of the vehicle to actuate in a known manner. When the vehicle operator removes pressure from the brake pad, air is vented from the pressure side 24 of the service chamber 16 and the return spring 28 forces the pushrod 14 inwardly of the service chamber 16 allowing the lever arm 34 to return to its unactuated position. It should be understood by those of skill in the art, that the caliper 36 described above functions in a normal manner.

Figure 2A:
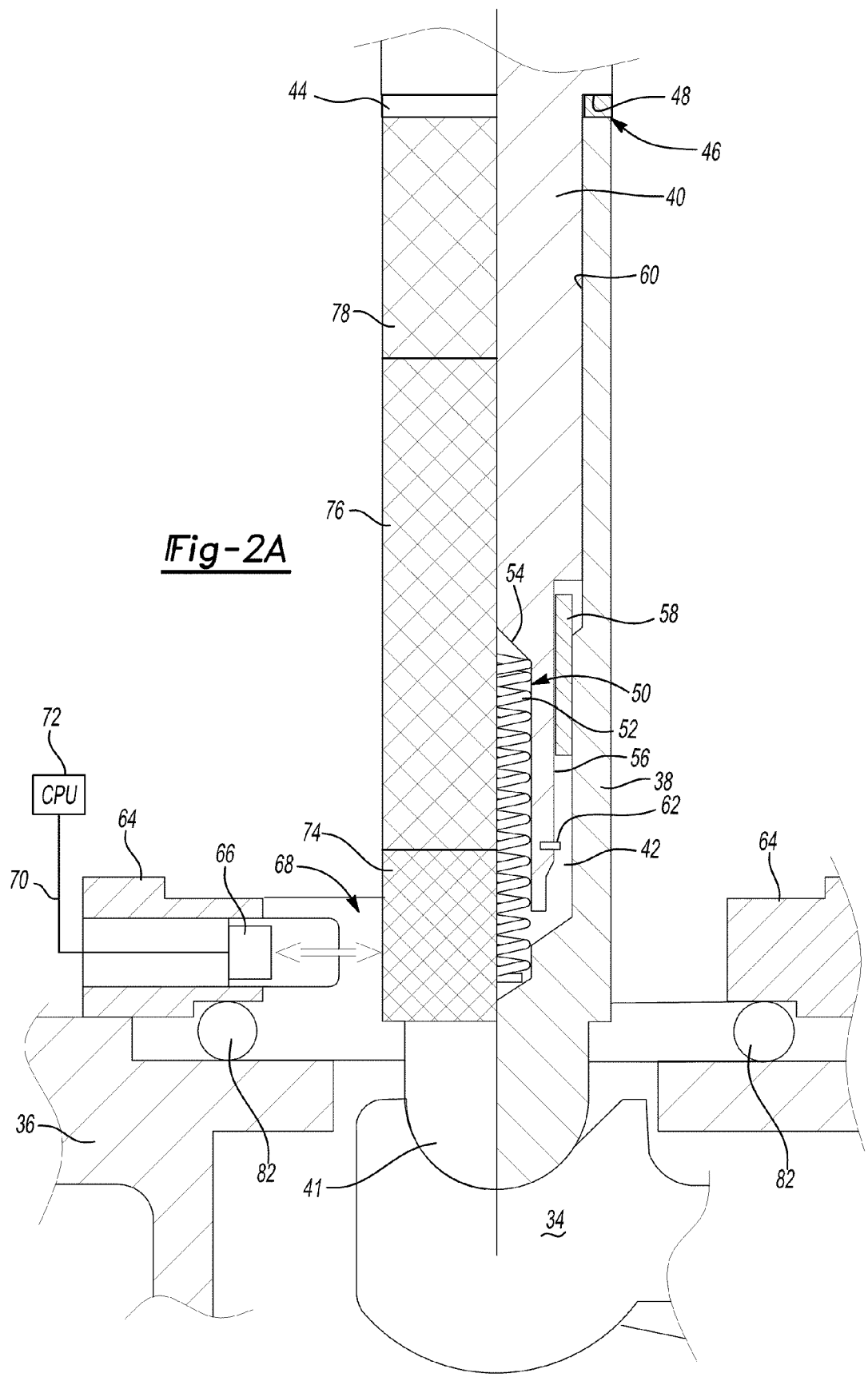
FIG. 2a shows a first embodiment of the pushrod of the present invention.

Referring now to FIG. 2A, the pushrod 14 includes a contact member 38 that circumscribes a pushrod shaft 40. The contact member 38 defines a terminal end 41 that abuts the lever arm 34 of the caliper 36. The pushrod shaft 40 is received in a tubular opening 42 defined by the contact member 38. An adjustment shim 44 is disposed at a base 46 of the tubular opening 42 and is sandwiched between a shaft stop 48 of the pushrod shaft 40 and the base 46. The adjustment shim 44 is provided in a plurality of thicknesses from which the length of the pushrod 14 is adjusted to provide dimensional accuracy between terminal end 41 of contact member 38 and lever arm 34 as will become more evident below.

The pushrod shaft 40 defines an elongated opening 50, which receives a biasing member 52 shown here in the form of a spring. The biasing member 52 is compressed between a floor 53 and a terminal wall 54 of the elongated opening 50. Therefore, the biasing member 52 provides a biasing force that telescopes the contact member 38 from the pushrod shaft 40, affectively lengthening the pushrod 14.

The pushrod shaft 40 defines a circumscribing groove 56 into which a retaining member 58 that is fixedly attached to an inner wall 60 of the tubular member 42 is received. The retaining member 58 slides in an axial direction defined by the pushrod shaft 40 within an expanse of the groove 56. A stop 62 prevents the biasing member 52 from separating the contact member 38 from the pushrod shaft 40 when abutted by the retaining member 58. The stop 62 takes the form of a spring clip or equivalent received by a notch 63 (FIG. 3) in the pushrod shaft 40.

A sensor element 64 is sandwiched between the service chamber 16 and the caliper 36. A sensor 66 is disposed inside the sensor element 64 and is provided sensing access to the contact member 38, which is received through an opening 68 in the sensor element 64. The sensor 66 communicates through communication line 70 with a controller or central processing unit 72. The sensor 66 is contemplated by the inventors to take the form an optical sensor, a magnetic sensor, a mechanical sensor, or a radio frequency enhanced sensor. For clarity, however, the following description will describe an optical sensor, further contemplated to be an infrared sensor. The exemplary embodiment makes use of an Optek infrared optical OPB733TR sensor capable of both transmitting an infrared signal and receiving a reflected infrared input. However, it should be understood by those of skill in the art, that any of the sensors explained above are operable. As best represented in FIG. 2a, the contact member 38 defines a non-reflective surface 74, a semi-reflective surface 76, and a fully reflective surface 78.

As best seen in FIG. 1, a sealing boot 80 seals to the pushrod shaft 40 at an upper end and to the sensor element 64 at an opposite end. Therefore, the contact member 38, and the non-reflective, semi-reflective, and fully reflective surfaces 74, 76, 78 are protected from environmental contamination that is known to enter the service chamber 16. A secondary seal 82 seals the sensor element 64 to the caliper 36, which is fully enclosed to protect the lever arm 34 from environmental contamination. Therefore, the contact member 38 and the sensor 66 are completely protected from the environment, preventing the optical sensor 66 and the reflective surfaces 74, 76, 78 from becoming fouled.

Figure 2B:
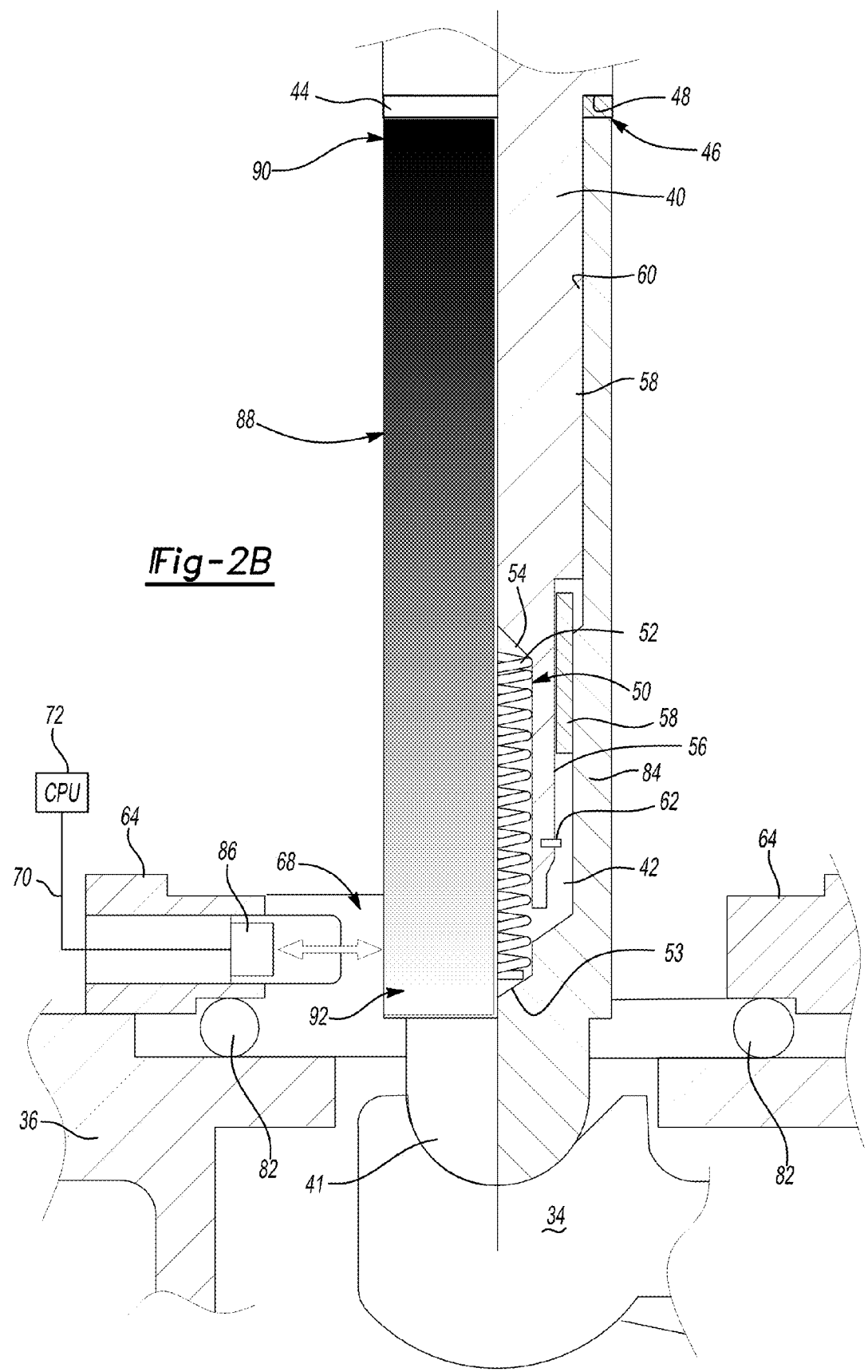
FIG. 2b shows an alternative embodiment of the pushrod of the present invention.

An alternative embodiment is shown in FIG. 2b where common elements have the same numbers as those elements disclosed in FIG. 2a. The alternative embodiment makes use of an alternative contact member 84 and a linear sensor 86. The alternative contact member 84 includes an alternative reflective coating 88 that has a variable reflective surface. A first end 90 of the contact member is more reflective than a second end 92 of the contact member with a gradual transition in between. The sensor detects the variation in the amount of reflectivity to determine the location of the alternative contact member 84, and therefore the lever arm 34 as will become more evident in the description below.

The sequence of brake monitoring will now be described. It is contemplated by the inventors that the sensor 66 takes the form of an infrared sensor that transmits an infrared signal toward the contact member 38 which has varying degrees of reflectivity as described above to reflect the infrared signal back toward the sensor 66, which in turn signals the controller 72 the degree of reflectivity via communication lines 70. It should be understood to those of skill in the art that other optical sensors may be used, including photoelectric digital lasers, ordinary lasers, and equivalents.

During normal operation, when the brake is released (shown in FIG. 1), the optical sensor transmits a light signal toward the non-reflective surface 74 of the contact member 38 receiving no reflective signal from the contact member 38. The brake application pressure, as indicated by the pressure sensor 32, is less than or equal to about 2 psi. Therefore, no active fault is signaled to the vehicle operator.

Figure 4:
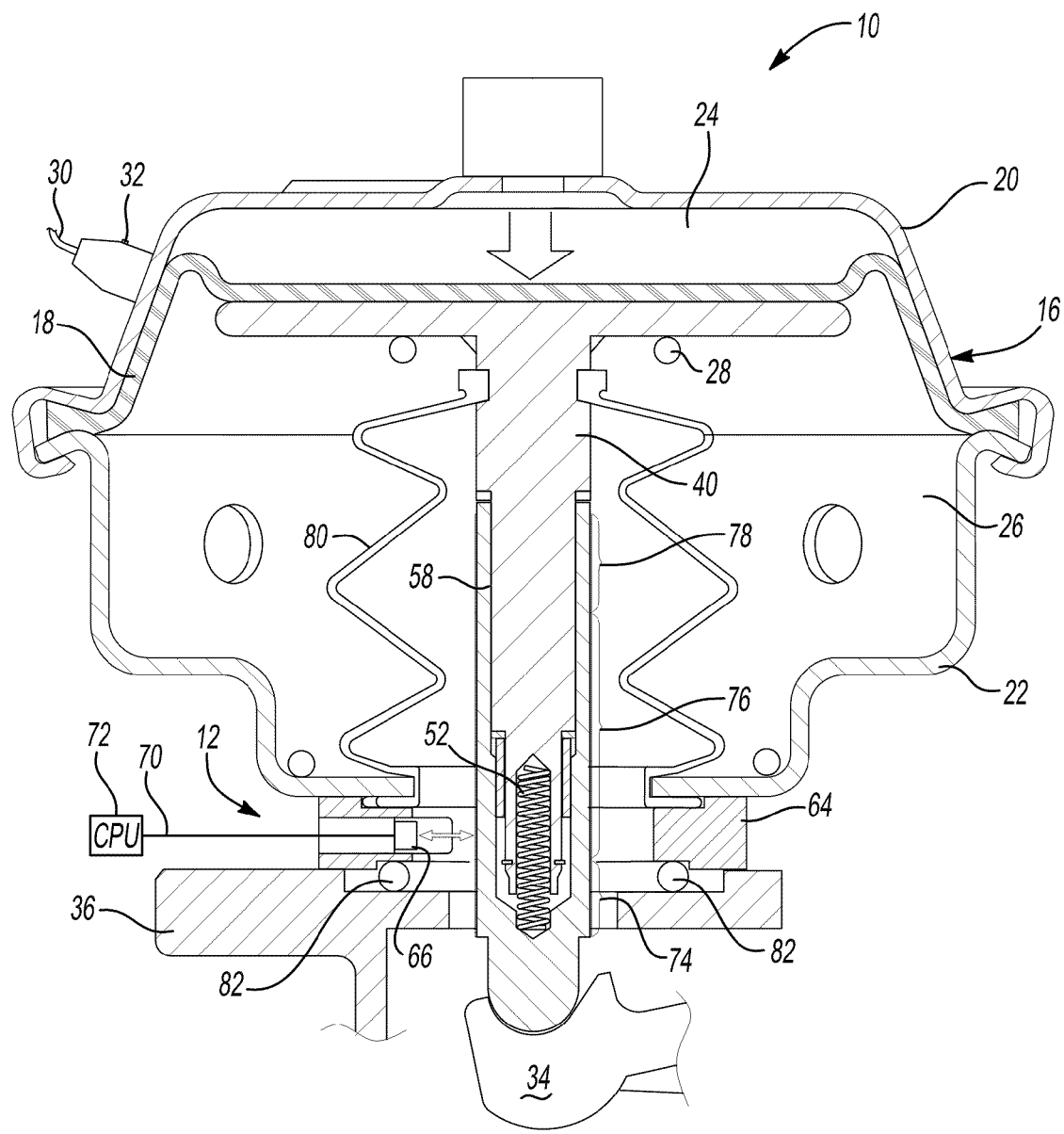
FIG. 4 shows the brake actuator in an extended position in a normal operating condition.

Referring now to FIG. 4, pressure is applied to the brake pedal by the operator causing air to fill the pressure side 24 of the service chamber 16 to actuate the lever arm 34. Because the pushrod 14 is forced outwardly from the service chamber 16 by the diaphragm 18, the sensor 66 is positioned proximate the semi-reflective surface 76 of the contact member 38. The pressure sensor 32 signals air pressure of greater than or equal to about 2 psi indicating normal operation of the brake actuator 10 so long as the sensor 66 detects reflectivity from the semi-reflective surface 76. It is contemplated by the inventors that the semi-reflective surface 76 reflects about thirty percent of the light transmitted from the sensor 66. It should be noted that the biasing member 52 remains fully compressed because the lever arm 34 counteracts the biasing force of the biasing member 52 during normal, activated condition.

Figure 5:
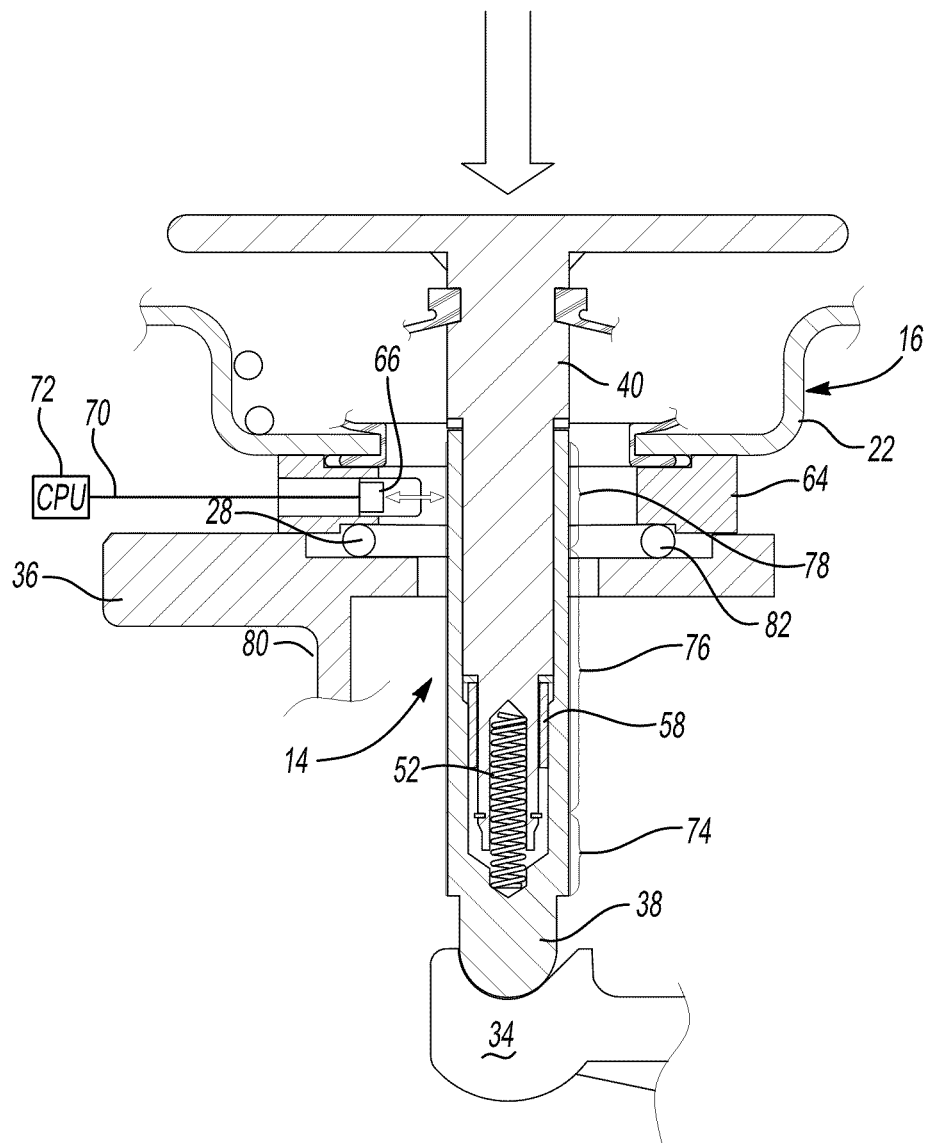
FIG. 5 shows a partial sectional view of the brake actuator in an over stroke condition.

FIG. 5 shows an overstroke condition causing the controller 72 to signal the operator that a fault condition exists. In the overstroke condition, the pushrod 14 extends outwardly of the service chamber 16 beyond normal extension length so that the sensor 66 transmits light to the fully reflective surface 78 and detects a full reflectivity. The brake pressure, as detected by the pressure sensor 32, is greater than or equal to about 2 psi. Therefore, the sensor 66 signals the controller 72 full reflectivity with normal application pressure causing the controller to signal an over stroke condition to the operator.

Figure 6:
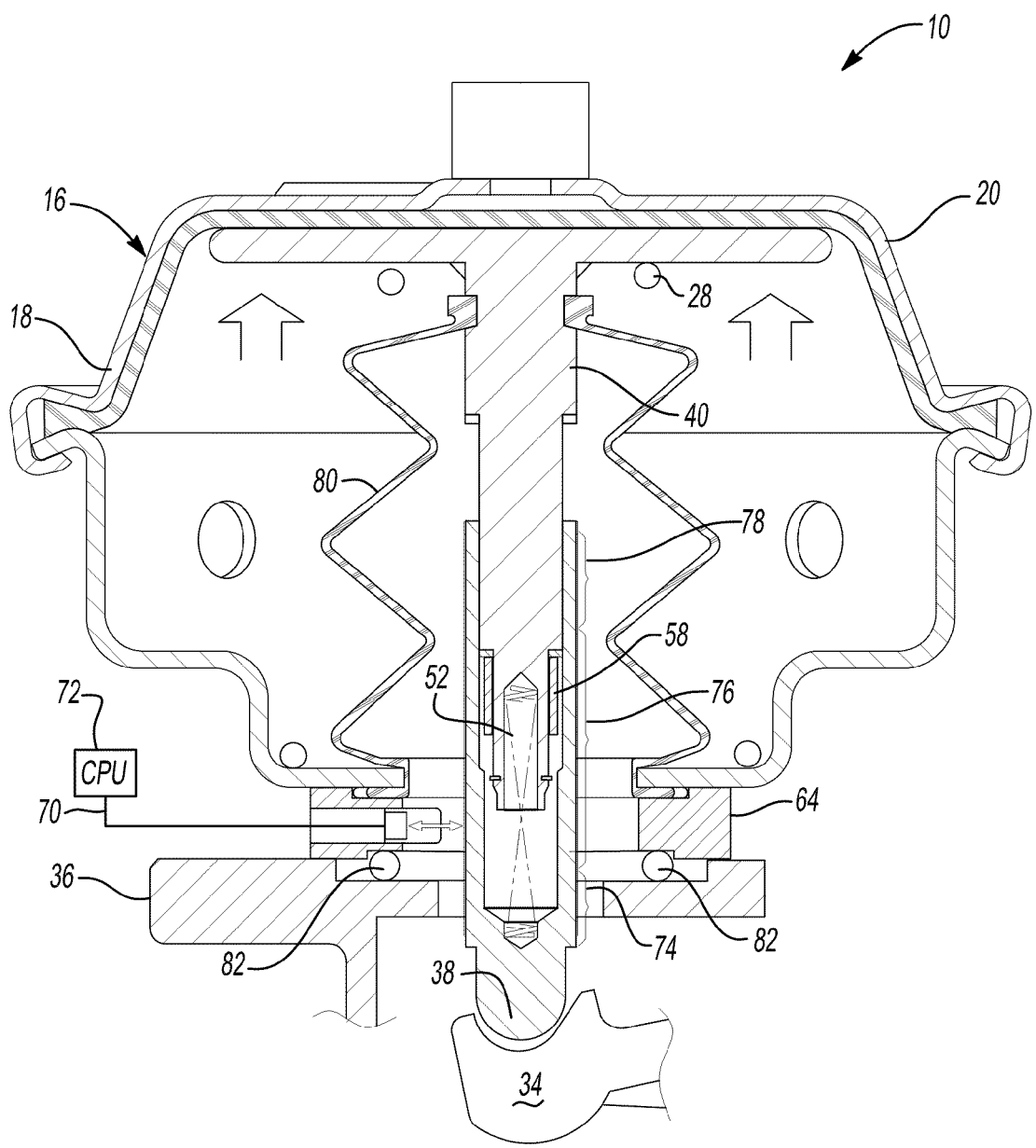
FIG. 6 shows the brake actuator of the present invention having a hanging or dragging brake condition.

FIG. 6 represents a dragging brake condition. The dragging brake condition is identified by the controller 72 both when the vehicle is moving at road speed and when the vehicle is not moving at road speed. In the dragging brake condition, air pressure has been released from the pressure side 24 of the service chamber 16 causing the return spring 28 to retract the pushrod 14 into the service chamber 16. However, because the brake is now subject to a dragging condition, the lever arm 34 is retained in the actuated position causing separation with the contact member 38. Because the lever arm 34 is no longer counteracting the biasing force of the biasing member, the biasing member 52 causes the contact member 38 to telescope from the pushrod shaft 40. Therefore, the sensor 66 now transmits light toward the semi-reflective surface 76 of the contact member 38 as opposed to transmitting light toward the non-reflective surface 74 as is typical of a normally functioning brake. Because the pressurized air has been vented from the pressure side 24 of the service chamber 16, the brake application pressure now reads less than or equal to about 2 psi. The combination of the semi-reflective surface 76 being detected by the sensor 66 and the low air pressure of less than or equal to about 2 psi causes the controller 72 to indicate a dragging or hanging brake condition.

A further fault condition is indicated when the sensor 66 detects the non-reflective surface 74 when the brake pedal is depressed by the operator causing an air pressure reading of greater than or equal to about 12 psi. In this instance, the controller signals a non-functioning actuator condition to the operator.

The invention has been described in an illustrative manner, and it is to be understood that the terminology that has been used is intended to be in the nature of words of description rather than of limitation.

Obviously, many modifications and variations of the present invention are possible in light of the above teachings. For example, a hall effect or equivalent sensor can be used in combination with a magnet affixed to the contact member 38 having varying degrees of magnetism. It is therefore to be understood that within the specification, the reference numerals are merely for convenience, and are not to be in any way limiting, the invention may be practiced otherwise than is specifically described.

What is claimed is:

1. A vehicle brake monitor assembly for an air disk brake, comprising:
   a brake actuator including a pushrod projecting from inside a chamber of said brake actuator, said pushrod releasably actuating a lever arm of a caliper thereby moving the disk brake into a braking position when said pushrod is in an extended position and releasing the disk brake from the braking position when said pushrod is in a retracted position;
   said pushrod including a pushrod shaft and a contact member biased in a telescoping relationship relative to said pushrod shaft and said lever arm of the caliper abutting said contact member thereby counteracting a bias of said contact member during normal operation of said brake actuator;
   a pressure sensor for detecting pressure from actuating a brake pedal;
   a sensor integrated with said assembly proximate said contact member, said sensor sensing movement of said contact member relative to said lever arm and to said pushrod shaft by sensing movement of indicia disposed upon said contact member for determining a condition of said brake actuator including a hanging brake and an overstroke condition when movement of said indicia is inconsistent with the pressure from actuating the brake pedal.

2. The assembly set forth in claim 1, wherein said sensor comprises at least one of an optical sensor, a magnetic sensor, a mechanical sensor or a radio frequency enhanced sensor.

3. The assembly set forth in claim 1, wherein said contact member of said pushrod includes a signal medium detectable by said sensor.

4. The assembly set forth in claim 1, wherein said sensor is disposed inside a sensor pack located between said brake actuator and said caliper.

5. The assembly set forth in claim 1, wherein said sensor detects movement of said contact member by sensing variations in said signal medium.

6. The assembly set forth in claim 5, wherein said variations in said signal medium include separable signal features or a transitioning signal feature varying a degree of signal generated by said signal medium.

7. The assembly set forth in claim 5, wherein said separable signal features include a detectable surface, a semi-detectable surface, and a non-detectable surface.

8. The assembly set forth in claim 1, wherein said contact member comprises a sleeve circumscribing said pushrod shaft, and being biased relative to said pushrod shaft in a telescoping direction by a biasing member.

9. The assembly set forth in claim 1, wherein said sensor senses separation between said pushrod shaft and said contact member thereby identifying a hanging brake.

10. The assembly set forth in claim 1, wherein said pushrod includes a shim disposed between said contact member and said pushrod shaft for adjusting a length of said pushrod.

11. A method of monitoring the stroke of a brake actuator of an air disk braking system having a pneumatic chamber actuating a pushrod for exerting force on a lever arm of the air disk brake, said pushrod including a pushrod shaft and a contact member disposed in a telescoping relationship with said pushrod shaft, said method comprising the steps of:
   detecting pressure generated by actuating a brake pedal;
   detecting a length of extension of said pushrod by sensing variation of a sensible medium disposed upon said pushrod thereby distinguishing between a normal and an overstroke condition of said pushrod; and
   detecting contact between said pushrod and said lever arm of said air disk brake by determining the length of telescopic extension of said contact member relative to said pushrod shaft by sensing variation of said sensible medium thereby identifying a hanging brake condition by identifying if separation has occurred between said contact member and said lever arm when the length of telescopic extension of said contact member is inconsistent with the pressure generated by actuating said brake pedal.

12. The method set forth in claim 11, wherein said steps of detecting length of extension of said pushrod is further defined by detecting excessive length of extension during a high pressure phase thereby identifying free brake condition exceeding a normal free brake condition.

13. The method set forth in claim 11, wherein said step of detecting a length of extension of said pushrod is further defined by sensing transition between a plurality distinguishable, sensible mediums disposed upon said contact member.

14. The method set forth in claim 11, wherein said step of detecting a length of extension of said pushrod is further defined by sensing a linear transition of said sensible medium.

15. The method set forth in claim 11, wherein said steps of detecting a length of extension of said pushrod and detecting contact between said pushrod and said lever arm are further defined by providing an optical sensor, a magnetic sensor, a mechanical sensor or a radio frequency enhanced sensor.

16. The method set forth in claim 11, wherein said steps of detecting a length of extension of said pushrod and detecting contact between said pushrod and said lever arm are further defined by detecting varying degrees of reflectivity of said contact member.

17. The method set forth in claim 11, wherein said steps of detecting a length of extension of said pushrod and detecting contact between said pushrod and said lever arm are further defined by transmitting an optical signal toward said sensible medium and receiving a reflective signal at an optical sensor.

18. The method set forth in claim 17, wherein said steps of transmitting an optical signal toward said sensible medium and receiving a reflective signal at an optical sensor is further defined by transmitting an infrared signal.

19. The method set forth in claim 11, further including the step of providing a sensor pack having a sensor capable of detecting a length of extension of said pushrod and detecting contact between said pushrod and said lever arm.

20. The method set forth in claim 11, wherein said step of identifying a hanging brake condition is further defined by detecting contact between said pushrod and said lever arm of said air disk brake by determining the length of telescopic extension of said contact member relative to said pushrod shaft during a low pressure phase.

21. A vehicle brake monitor assembly for an air brake, comprising:
a brake actuator having a pushrod slidably extending from a chamber of said brake actuator, said pushrod actuating a lever arm of the air brake thereby moving the vehicle brake into an actuated position when said pushrod is disposed in an extended position and allowing the brake to move into a retracted position when said pushrod is disposed in a retracted position; said pushrod comprising a pushrod shaft and a contact member having a telescoping bias from said pushrod shaft for releasably contacting the lever arm of the air brake;
a pressures sensor for detecting pressure from actuating a brake pedal;
an optical sensor transmitting a light signal toward said contact member and detecting a variation in an amount of reflectivity from said contact member with said controller determining which of a plurality of conditions of said brake actuator is present including an overstroke and a hanging brake condition, which is dependent upon telescoping position of said contact member, and the pressure is inconsistent with the amount of reflectivity detected from said contact member.

22. The assembly set forth in claim 21, wherein said sensor comprises an infrared sensor thereby transmitting an infrared signal toward said contact member and detecting an amount of reflectivity of said infrared signal from said contact member.

23. The assembly set forth in claim 21, wherein said contact member includes a reflective coating having varying degrees of reflectivity thereby enabling said sensor to detect the location of said contact member.

24. The assembly set forth in claim 21, wherein said contact member includes a reflective surface, a non-reflective surface, and a semi-reflective surface thereby providing a varying degree of reflectivity to said sensor.

25. The assembly set forth in claim 21, wherein said sensor is disposed in a sensor pack disposed between said brake actuator and the air brake housing.

26. The assembly set forth in claim 21, wherein said sensor is electronically connected to a controller and said controller is programmed to determine a normal brake condition, an overstroke brake condition, and a hanging brake condition based upon air pressure and a level of reflectivity signaled to said controller from said sensor.

27. The assembly set forth in claim 21, said contact member releasably interfaces with the lever arm of said brake.

28. The assembly set forth in claim 21, wherein the air brake comprises an air disk brake.

* * * * *